United States Patent [19]

Grosjean

[11] Patent Number: 4,713,565
[45] Date of Patent: Dec. 15, 1987

[54] SINGLE-PHASE MOTOR WITH A MAGNETIZED ROTOR

[76] Inventor: Michel Grosjean, 1, rue des Narcisses, Bienne 2504, Switzerland

[21] Appl. No.: 855,305
[22] PCT Filed: Jul. 11, 1984
[86] PCT No.: PCT/CH84/00112
 § 371 Date: Mar. 10, 1986
 § 102(e) Date: Mar. 10, 1986
[87] PCT Pub. No.: WO86/00765
 PCT Pub. Date: Jan. 30, 1986

[51] Int. Cl.$^4$ .............................. H02K 37/00
[52] U.S. Cl. ............................. 310/49 R; 310/162; 310/257
[58] Field of Search ............ 310/49, 162–165, 310/172, 257

[56] References Cited

U.S. PATENT DOCUMENTS

| | | | |
|---|---|---|---|
| 3,845,335 | 10/1974 | Oguey | 310/49 |
| 3,989,967 | 11/1976 | Kikuyamo | 310/49 X |
| 4,207,483 | 6/1980 | Baer | 310/49 |
| 4,217,509 | 8/1980 | Sadler | 310/49 |
| 4,629,924 | 12/1986 | Grosjean | 310/49 X |

FOREIGN PATENT DOCUMENTS

| | | |
|---|---|---|
| 2938771A1 | 4/1981 | Fed. Rep. of Germany . |
| 1238445 | 7/1960 | France . |
| 2209246 | 6/1974 | France . |
| 2283576 | 3/1976 | France . |
| 2435150 | 3/1980 | France . |
| 1531314 | 11/1978 | United Kingdom . |
| 1537048 | 12/1978 | United Kingdom . |
| 1586056 | 3/1981 | United Kingdom . |

*Primary Examiner*—Donovan F. Duggan
*Attorney, Agent, or Firm*—Parkhurst & Oliff

[57] ABSTRACT

A motor, comprising a rotor with eight axes of magnetization being parallel to its axis of rotation and alternately inverted; a stator having two coplanar polor pieces with interleaved pole shoes on either side of the rotor, a sinuous air gap being formed around every pole shoe and every polar piece having four pole shoes spaced apart by an angular gap twice as large as that between the adjacent axes of magnetization of the rotor, and a coil wound around a core to which the different polar pieces are magnetically connected. According to the different means it may comprise, the motor can operate in a step-by-step bipolar mode, in a step-by-step unipolar mode or in a continuous synchronous mode, with an optimum yield.

7 Claims, 13 Drawing Figures

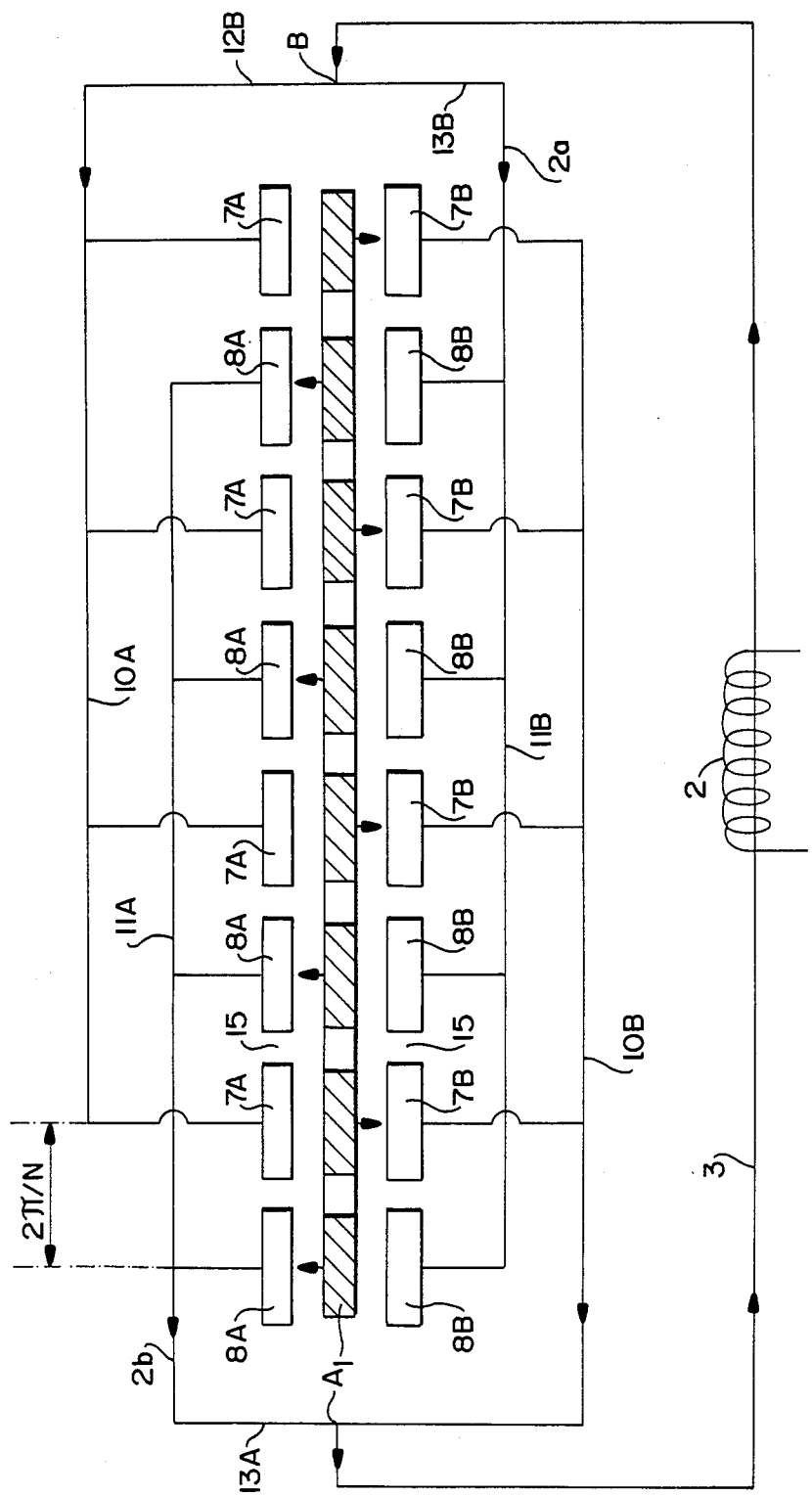

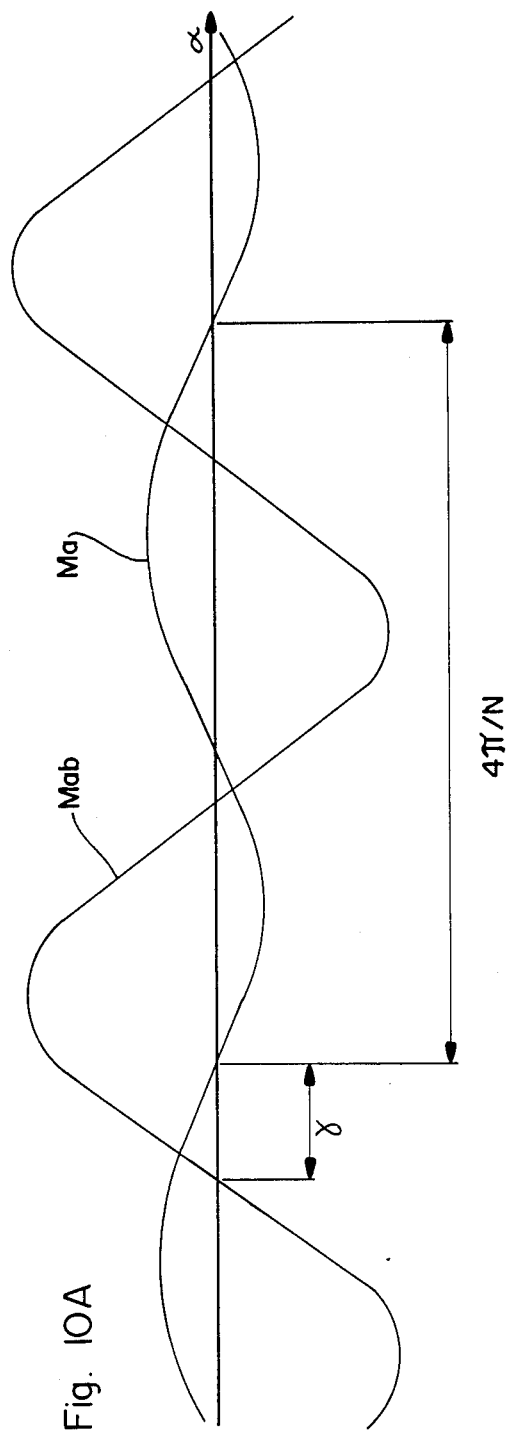
Fig. 10A
Fig. 10B

SINGLE-PHASE MOTOR WITH A MAGNETIZED ROTOR

This invention relates to the single-phased motor with a magnetized rotor. There exists different types of motors with a magnetized rotor.

Moreover, there exists different motors of the same type as that according to the present invention. By same type, one understands that the motor comprises a rotor, whose magnetization axes are parallel to the axis of rotation of the rotor. However, the existing motors of this type have shortcomings due to the design of their structure, which reduce in particular their yield. That will clearly appear hereinafter on the basis of the equivalent diagram of the motor according to the present invention.

The invention has for its object the design an electric motor having an optimum yield in a given space while using existing materials and being capable of being fabricated by industrial procedures.

Another object of the invention is to design a motor whose power range can be quite extensive without changing the design of the motor.

Another object of the invention is to design a motor whose number of steps per revolution can be very large without altering the design of the motor.

It will appear that the structure of the motor according to the invention can be adapted either to a step-by-step mode of operation or to a continuous one, usually called synchronous.

With a step-by-step mode of operation, in a space reduced to 8×8×2 mm and by using for the rotor a material such as samarium-cobalt of 20 MGOe and while being industrially manufacturable in great series, the motor according to the invention has a yield of about 50%. The yield is even higher when the space is more important, the materials used more performing and the manufacturing tolerances narrower.

The power typically can be of 100 μW for the lower powers and can reach much higher powers without modifying the design of the motor.

The application field of the motor according to the present invention is thus very extensive.

Medical instruments, including systems that can be incorporated into the human body, drive systems for the aeronautical and spatial industries, office automation, robotics, photographic equipment, timekeepers, etc., can employ the motor of the present invention.

More generally, the motor according to the present invention, when operating in the step-by-step mode, is adapted to all systems employing a digital technique and, more particularly, to all systems when space, yield and power criteria are a determining factor.

BRIEF DESCRIPTION OF THE DRAWINGS

FIGS. 8a and 8b show the behavior of the positioning and mutual torques as well as the voltage surges to be applied to the coil when the motor is adapted to the unipolar step-by-step mode of operation.

DESCRIPTION OF THE PREFERRED EMBODIMENTS

The drawings show by way of example the motor according to the invention with a rotor having a number of pairs of poles equal to 8 (N=8).

Figure 1:
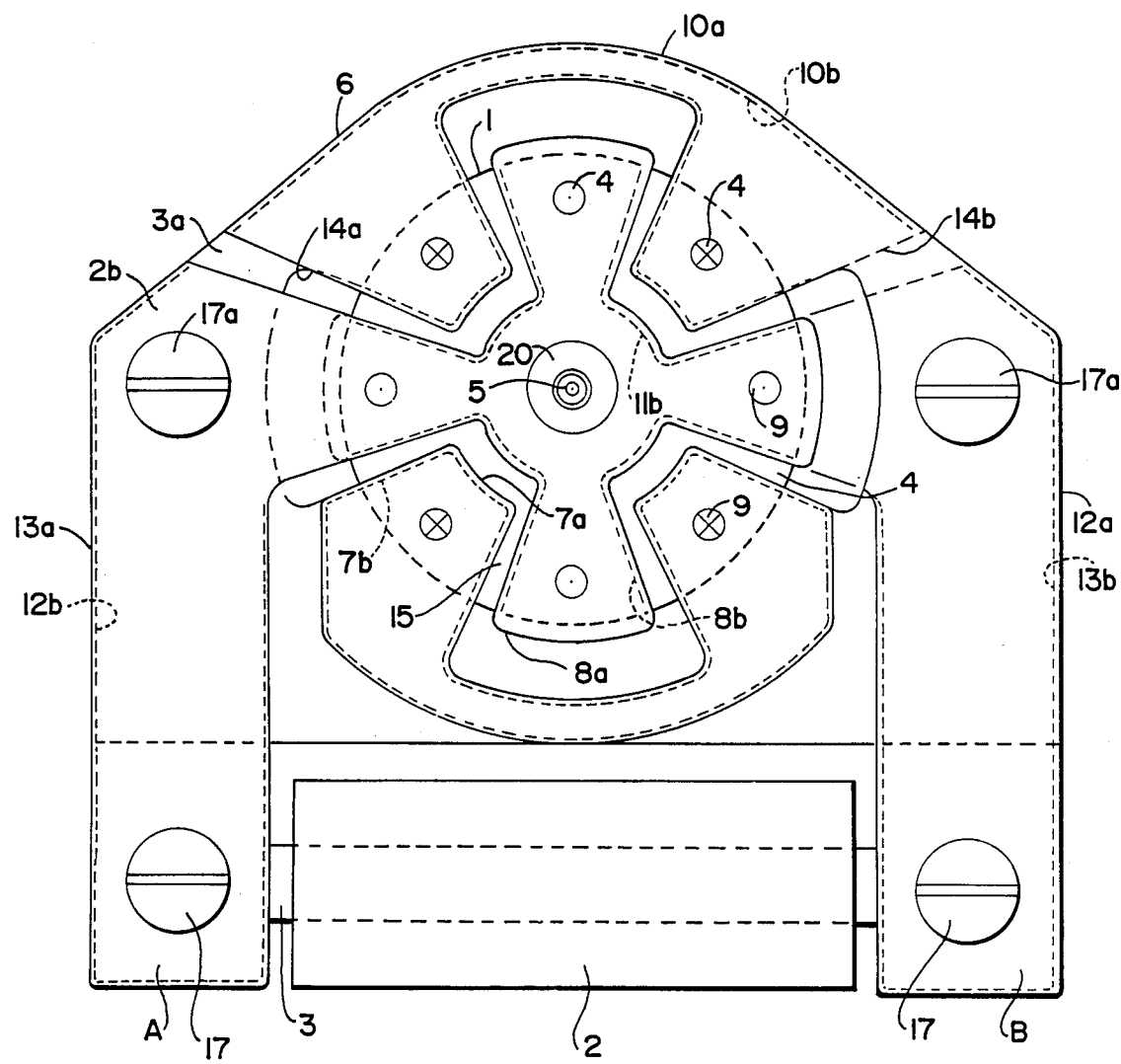
FIG. 1 shows a simplified top plan view of the motor according to the invention.
Figure 2:
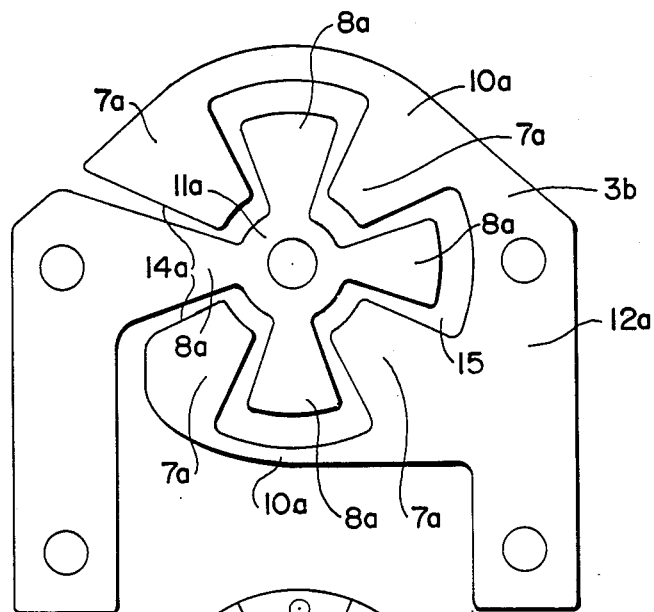
FIGS. 2A, 2B and 2C show a simplified exploded view of the motor illustrating its structure.

For the understanding of the structure of the motor according to the invention, particular reference to FIGS. 2A, 2B and 2C will advantageously be made.

This figure is a simplified exploded top plan view of the motor, which clearly illustrates the motor structure.

The rotor 1 is of ferromagnetic material with a high coercive field and a small volumetric mass such as samarium-cobalt. It has N pairs of poles 1p whose axes of magnetization are parallel to the axis of rotation 1a of the rotor and are separated by an equal angular gap. The direction of magnetization of every one of these axes is inverted with respect to that of the adjacent axis.

The rotor 1 is located between two stators, the lower stator being marked a and the upper stator b.

Each stator is composed of two coplanar polar pieces, the internal piece being interleaved with the external piece, being designated as follows:

2a for the internal polar piece of the lower stator a;

3a for the external polar piece of the lower stator a;

2b for the internal polar piece of the upper stator b; and 3b for the external polar piece of the upper stator b.

The polar pieces are of a ferromagnetic material with a weak coercive field and with a high saturation induction.

The two polar pieces of each stator are coplanar and separated by a sinuous air gap 4.

Each polar piece consists of N/2 poles 5 spaced an angular distance twice that between the adjacent magnetization axes of the rotor.

The internal polar piece 2b of the upper stator b is magnetically connected to a first end A of a core 6 whose second end B is magnetically connected to the internal polar piece 2a of the lower stator a, i.e., the polar piece of the lower stator, the poles of which are directly opposite.

The other polar piece of the upper stator, i.e., the external polar piece 3b, is magnetically connected to the second end B of core 6 whose first end A is magnetically connected to the polar piece 3a of the lower stator, i.e., the polar piece of the lower stator, the poles of which are directly opposite.

The core 6 is made of a ferromagnetic material with a weak coercive field and a high saturation induction.

A coil 7 is wound around the core.

Figure 3:
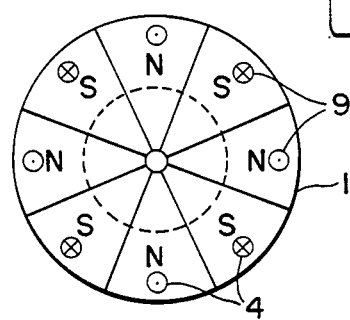
FIG. 3 shows a simplified lateral sectional view of the motor illustrating the positioning principle of the motor.

The assembly is mounted, for example, in the manner shown in FIG. 3 and described hereinbelow.

The lower stator is placed on a piece of non-ferromagnetic material 8. The polar pieces 2a, 2b, 3a and 3b are positioned by four pedestal screws 9. Two pedestal screws 9a further have a shoulder 10 on which rest the polar pieces of the upper stator. The pedestal screws may or may not be of soft ferromagnetic material. Two distance pieces 11 of soft ferromagnetic material are interposed in the space between each of the ends of the core and each polar piece of the upper stator.

The mounting device described hereinabove ensures through the pedestal screws the proper positioning in their planes of the polar pieces and, through the shoulders and distance pieces, the proper vertical positioning of the polar pieces.

Figure 4:
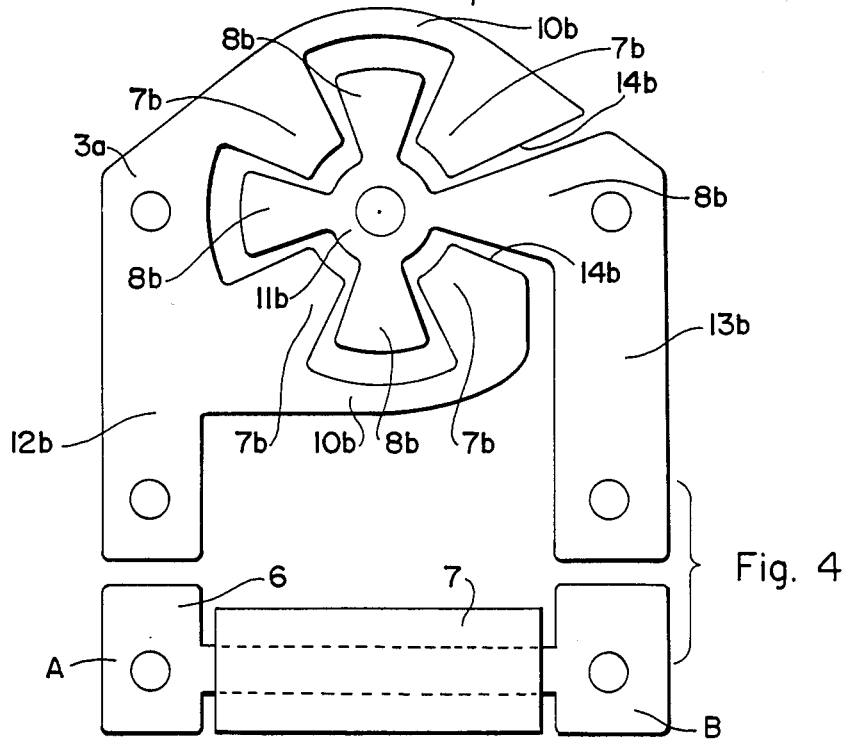
FIG. 4 shows a simplified sectional view of the motor illustrating the mounting principle of the motor.

The rotor is mounted in the manner shown in FIG. 4.

The rotor pivots in the bearings 12 with a slight contact friction. The material used for the bearings is, for example, ruby.

A pinion 13 is integral with the axis of rotation of the rotor and enables the rotational movement of the rotor to be transmitted to the entire gear train 14.

Moreover, the poles of the polar pieces can be made asymmetrical in relation to the radial axes defining the angular interpolar gap. An example is given in FIG. 5. As will be seen further below, this design permits the creation of a phase displacement between positioning and mutual torques, thereby allowing the self-starting of the motor.

It is likewise possible to keep the poles of the polar pieces symmetrical and to create the positioning torque and the phase displacement by an auxiliary system. Such systems, which require the use of an auxiliary magnet, are known and will not be described herein.

Figure 6:
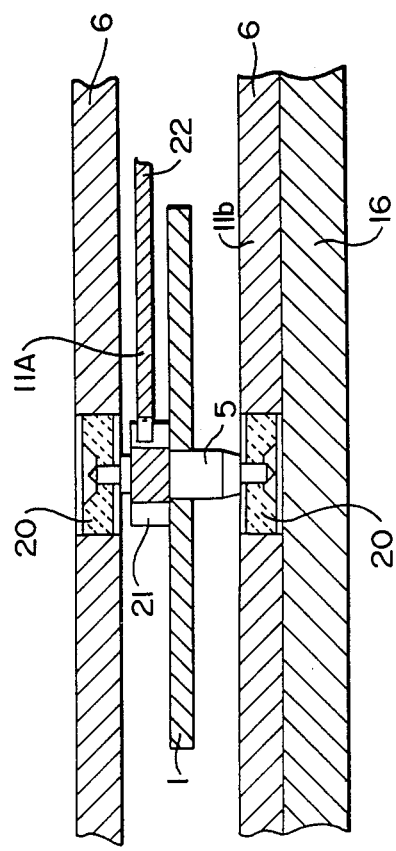
FIG. 6 is a linear unwinding of the motor illustrating its mode of operation.
Figure 9A:
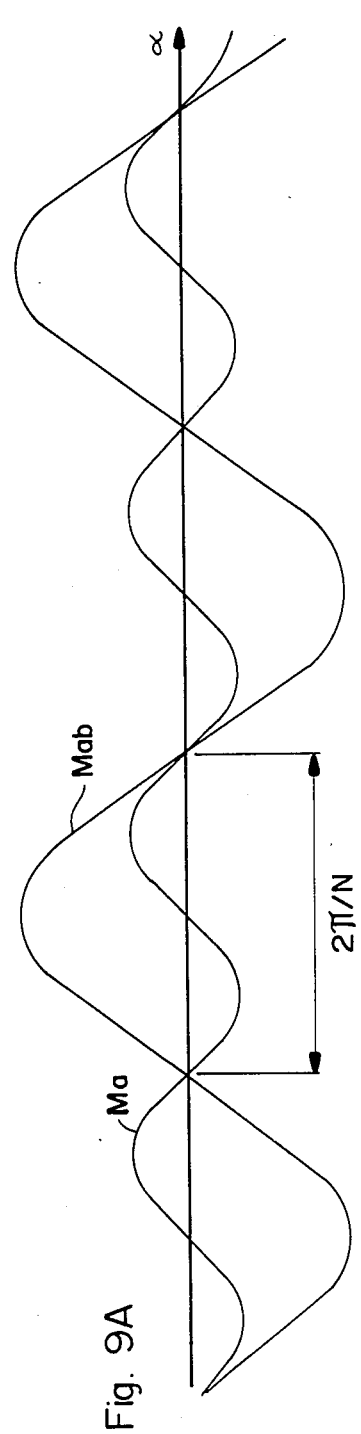
Figure 9B:
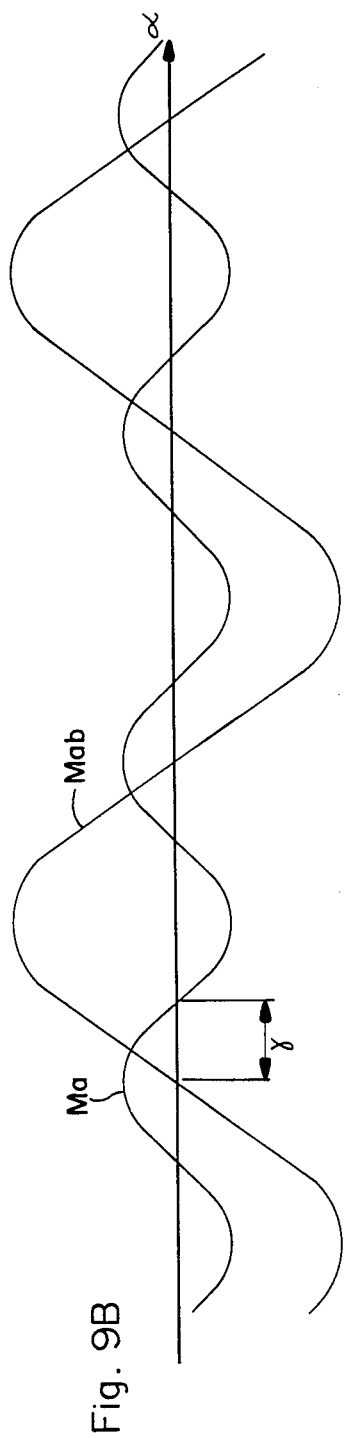
Figure 9C:
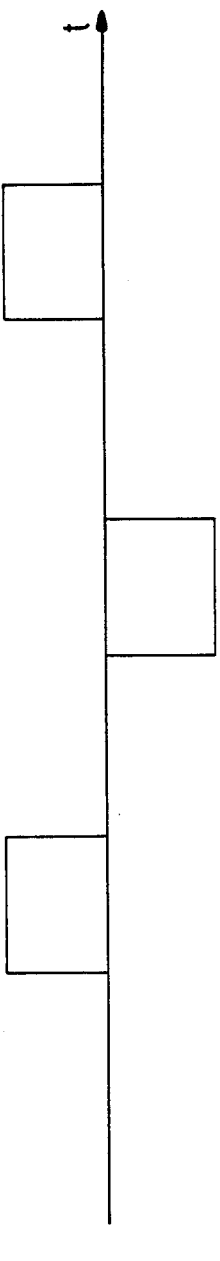

For the understanding of the operation of the motor according to the invention, reference is advantageously made to FIG. 6.

This figure shows a linear unwinding of the motor. Thus, this is a schematic cross section of the motor which has previously been unwound.

This figure shows the rotor 1, wherein the hatched parts correspond to the pairs of poles. Also visible are the poles 5 of the polar pieces separated by the air gap 4. The magnetic connections are shown symbolically by simple lines. Also shown are the ends A and B of the core 6. The coil 7 is wound around the core 6.

For the understanding of the operation, the manner in which the features are created will be shown. Then the behavior of the motor in accordance with the energizing mode will be shown.

The following features will be considered one after the other:

the mutual torque arising from the interaction between the flux of the magnetized rotor and the flux of the coil, the mutual torque whose creation forms the main object of this invention;

the permeance of the coil;

the positioning torque, i.e., that caused by the magnetized rotor in the absence of current in the coil, and the phase displacement introduced between the mutual torque and the positioning torque.

For the last two features, different versions will be examined, in accordance with the energizing mode.

Let us start with the mutual torque.

In the position of the rotor depicted in FIG. 6, the pairs of poles 1p of the rotor are directly opposite the poles 5 of the polar pieces of the lower and upper stators.

Let us consider the path followed by the fluxes coming from the pairs of poles of the rotor, the magnetization axes of which are directed from the upper stator b toward the lower stator a.

These fluxes are collected by the lower polar piece 3a and are routed by the magnetic circuit at the end A of the core. At point A, a large part of the flux then travels through core 6 from A to the other end B of the core. When it has reached the end B, the flux is then auto-reclosed by the poles of the upper stator 3b.

The reason why a large part of the flux arrived in A then travels through the core 6, and not through the polar piece 2b, is that for the flux coming from the mentioned pairs of poles of the rotor, the permeance for auto-reclosing itself through the poles of the polar piece 3b is greater than the permeance for auto-reclosing itself through the poles of the polar piece 2b.

This is due to the fact that the poles of the polar piece 3b are directly opposite the poles of the polar piece 3a, which is not the case of the poles of the polar piece 2b.

With the rotor still in the same position, let us examine the path followed by the fluxes coming from the pairs of poles of the rotor, the magnetization axes of which are inverted, i.e., are directed from the lower stator a toward the upper stator b. These fluxes are collected by the upper polar piece 2b and are routed by the magnetic circuit to the end A of the core. At point A, a large part of the flux then travels through the core 6 in the direction from A to the other end B of the core, i.e., in the same direction as for the adjacent pairs of poles. The fact that the fluxes of all of the pairs of poles of the rotor are combined in the core is attributable to the fact that, in the case under consideration, the polar piece 2b of the upper stator is magnetically connected to the end A of the core, the other end B of which is magnetically connected to the polar piece 2a of the lower stator, whereas the other polar piece 3b of the upper stator is magnetically connected to the other end B of the core, the end A of which is magnetically connected to the polar piece 3a of the lower stator.

Thus, it can be seen that in the position of the rotor shown in FIG. 6 the flux travelling through the core is at its maximum.

For the position of the rotor displaced by an angle $2\pi/N$ with respect to the previous position, it is easy to see that the flux travelling through the core is also at its maximum, but its direction is inverted with respect to that existing for the previous position of the rotor.

Therefore, the motor has flux reversal of the rotor in the core at an angle of rotation of the rotor equal to $2\pi/N$. When the coil wound on the core is energized, there arises, according to the laws of electromechanics, an interaction torque between the coil and the magnetized rotor, said torque hereinafter being called mutual torque, having a period $4\pi/N$ and positions of equilibrium corresponding to the positions of the rotor, for which the pairs of poles of the rotor are directly opposite the poles of the polar pieces of the stators.

Let us now consider the permeance of the coil.

The permeance of the coil is limited by the sinuous air gap between the coplanar polar pieces of each stator.

Let us now consider the two last-mentioned features, i.e., the positioning torque and the phase displacement. Three versions relative to the operating mode of the motor will be discussed one after the other.

These versions are the following:

bipolar step-by-step motor;

unipolar step-by-step motor;

synchronous motor.

These designations will easily be understood after reading the explanations given hereinbelow.

Let us first consider the first version called bipolar step-by-step motor.

Let us start with the positioning torque.

If there is no current, the motor has a torque due to the magnetized rotor, said torque being hereinafter called the positioning torque. In the position of the rotor depicted in FIG. 6, the permeance viewed by the fluxes coming from the pairs of poles of the rotor is at its maximum. In this position, in accordance with the laws of electromechanics, since the magnetic energy is negative, it is minimal and corresponds to a stable position of equilibrium.

Still without current, in the position of the rotor displaced by $\pi/N$ with respect to the previous position, the permeance viewed by the fluxes coming from the pairs of poles of the stator is minimal. Thus, according to the laws of electromechanics, there corresponds to said position a position of unstable equilibrium. Still without current, by displacing still further the rotor through $\pi/N$ with respect to the previous position, the permeance viewed by the fluxes of the pairs of poles of the rotor is again at its maximum and a position of stable equilibrium corresponds thereto.

Thus, the motor has a positioning torque with a period of $2\pi/N$.

Figure 7:
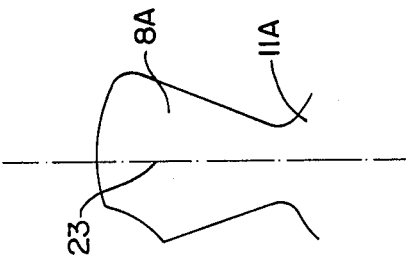
FIGS. 7a, 7b and 7c show the behavior of the positioning and mutual torques as well as the voltage surges to be applied to the coil when the motor is adapted to the bipolar step-by-step mode of operation.

The behavior of the positioning torque Ma and mutual torque Mba are shown in FIG. 7a as a function of the angle of rotation $\alpha$ of the rotor. In order to fix the orders of magnitude, it is of advantage, from the yield point of view, that the ratio of the positioning torque to the mutual torque is on the order of 0.25.

Let us now consider the phase displacement between the mutual and the positioning torques.

To allow the starting of the motor and to give a preferred direction of rotation to the rotor, it is, necessary to create an angular phase displacement between mutual and positioning torques.

Figure 5:
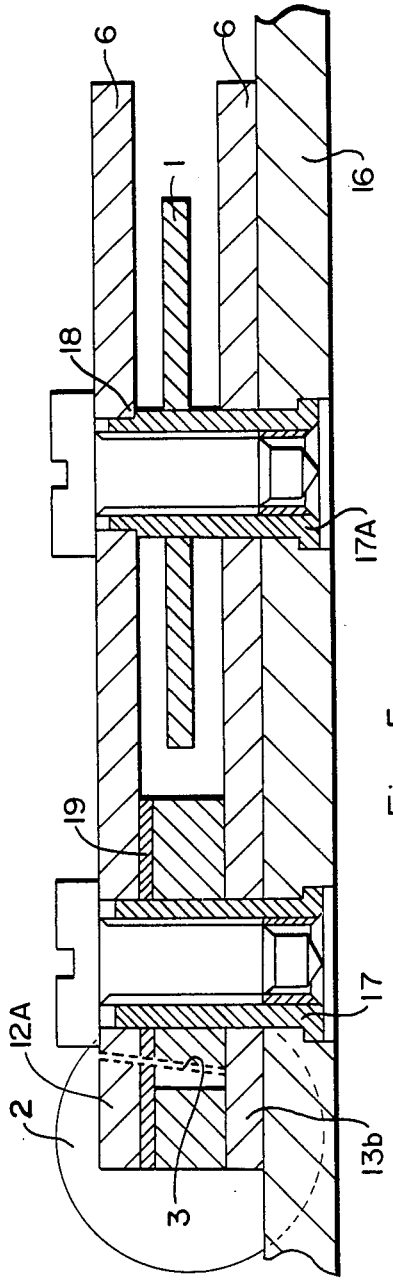
FIG. 5 shows the asymmetry of a pole of a polar piece.

By way of example, the phase displacement $\gamma$ can be created by the asymmetry of the poles of the polar pieces. A preferred embodiment is shown in FIG. 5.

The asymmetry of the poles of the polar pieces changes the position of the rotor for which the permeance viewed by the fluxes of the pairs of poles of the rotor is at a maximum and, accordingly, the position of stable equilibrium. This results in the angular displacement mentioned hereabove between mutual and positioning torques, as illustrated in FIG. 7b, as a function of the angle of rotation $\alpha$ of the rotor.

The behavior of the motor with the features described hereinabove when the coil is energized is known and will not be explained. However, it should be noted that, since the period of the positioning torque is half that of the mutual torque, the operation of the motor in the step-by-step mode in the same direction of rotation requires voltage surges of alternate polarity, such as shown in FIG. 7c, as a function of the time t. Thus, the motor is called a bipolar step-by-step motor.

Let us now consider the second version called unipolar step-by-step motor.

Let us start with the positioning torque.

In this modification, the poles of the polar pieces are so dimensioned that the positioning torque introduced by these poles is negligible when compared with the mutual torque. This can particularly be done by reducing the sinuous air gap between the coplanar polar pieces of the stators.

The positioning torque as well as the phase displacement are created by an auxiliary system such that the positioning torque has a period of $4\pi/N$, that is to say, the same period as that of the mutual torque. The manner in which such an auxiliary system can be designed is known and will not be explained. The behaviors of the positioning torque Ma and mutual torque Mab are given for this second modification in FIG. 8a, which is similar to FIG. 7b.

The behavior of the motor with the features described above when the coil is energized is known and will not be disclosed. However, it should be noted that since the period of the positioning torque is equal to that of the mutual torque, the operation of the motor in the step-by-step mode in the same direction of rotation requires voltage surges of the same polarity, such as shown in FIG. 8b, which is similar to FIG. 7c. The motor is called a unipolar step-by-step motor.

Obviously, it is also possible to use an auxiliary system if the motor is a bipolar step-by-step motor. The auxiliary system is then designed to give a positioning torque with a period $2\pi/N$.

Let us now consider the third version called synchronous motor.

It is obvious that the motor disclosed, operating in the step-by-step mode, can also function in the continuous mode. The positioning torque is made negligible with respect to the mutual torque. It is, however, advantageous to allow the existence of a small positioning torque and a phase displacement between this positioning torque and the mutual torque for the purpose of ensuring the self-starting of the motor.

The behavior of the motor with the features described above when the coil is energized is known and will not be explained. However, it should be noted that the operation of the motor in the continuous mode in the same direction of rotation requires an alternating voltage and that the rotational speed of the motor is proportional to the energizing frequency. Therefore, the motor is called synchronous.

Let us now consider the statement given hereinabove, namely, that the object of the invention is to provide a motor that is optimum from the yield point of view. In the motor of the present invention, the fluxes of all of the pairs of poles of the rotor travel in the same direction in the core of the coil thanks to the interleaving described above of the internal and external polar pieces and to the magnetic connection of the lower and upper stators by the core of the coil. Thus, there is no flux of a pair of poles that is lost in the meaning that it would not be auto-reclosed by the core and would not participate additionally in the mutual flux. This is a first prerequisite for obtaining an optimum yield.

Moreover, for the motor of the present invention, the flux of each pair of poles of the rotor is maximized by the fact that the flux collected by the poles of one polar piece of a stator is auto-reclosed by the directly opposite poles of the polar piece of the other stator, as already disclosed. This is a second prerequisite needed to obtain an optimum yield.

Finally, for the motor of the present invention in its step-by-step mode of operation, an additional point must be added. The fact that the rotor is full, meaning that there is no angular gap between the magnetization axes which is not equal to $2\pi/N$, optimizes, from the yield point of view, the relation between the total flux of the pairs of poles of the rotor and the inertia of the rotor. This is attributable to the fact that the yield is an increasing function of the flux and a decreasing function of the inertia, but that the power with which said function increases with the flux is greater than the power with which said function decreases with the inertia.

For the step-by-step operating mode, this is a third prerequisite to obtain an optimum yield.

Because of the combination of the prerequisites just mentioned hereinabove, it can be stated that the motor forming the subject matter of the present invention is optimum from the yield point of view.

It is also easy to infer that the other motors of the same type which do not satisfy all of these prerequisites, are not optimum from the yield point of view.

It will be understood that the operation of the motor is possible even if all of the prerequisites mentioned above are not met. A large number of modifications thus exist which are particular cases, being disadvantageous from the yield point of view, of the motor according to the invention and which constitute, in some cases, motors already existing.

The following modifications of the motor according to the invention can non-exhaustively be mentioned. It should be understood that for every proposed modification, the changes are made on the complete motor according to the invention.

Let us mention:
  suppression of one of the stators, the polar pieces of the other stator being magnetically connected by the core of the coil;
  suppression of the two external or of the two internal polar pieces, the remaining polar pieces being magnetically connected by the core;
  suppression of the sinuous air gap between the coplanar polar pieces and replacement for each stator by two straight radial air gaps, said air gaps being arranged in such a manner that the coplanar polar pieces have, in relation with the pairs of poles of the rotor, the same function as the internal and external polar pieces of the motor according to the invention, the magnetic connection between the lower and upper stators being the same as with the motor according to the invention.

Other modifications of the motor according to the invention or of one of its variants can be designed with respect to the coiling, provided that they comprise the two lower and upper stators and that each one of the latter comprises two polar pieces.

The modifications are mentioned in claims 10 and 11. With these modifications the motor, obviously, remains single-phased.

Let us now consider the statement made hereinabove to the effect that another object of the motor according to the invention is to provide a power range that can be very extensive without changing the design of the motor.

The mechanical power that can be supplied by the motor is a function that increases with the number of pairs of poles of the rotor as well as with the diameter of the rotor.

This state of affairs permits the widening of the power range of the motor without changing its design. Thus, it can be stated that the motor forming the subject of the present invention has a power range that can be very extensive without altering the design of the motor.

I claim:

1. A single-phased motor, comprising:
  a rotor having a first side and a second side and N pairs of poles, each of said pairs of poles having an axis of magnetization, the axes of magnetization being equidistant from and regularly distributed around an axis of rotation, each of said axes having a direction of magnetization, the directions of the magnetization of two adjacent axes being opposite one another;
  a coil for rotating said rotor, said coil having a core with an axis not coaxial with the axis of rotation of said rotor;
  a stator having N pole shoes, N/2 of which are located on each of said first and said second sides of the rotor, each of said stator pole shoes lying, while in a state of rest, substantially opposite one of said rotor poles having the same polarity as the stator pole shoe;
  a first and a second pair of polar pieces, said first pair located on the first side of said rotor and said second pair located on the second side of said rotor, each of said first and second pairs of polar pieces comprising a peripheral polar piece coplanar and interleaved with a central polar piece, said first pair of polar pieces magnetically interconnecting the stator pole shoes located on said first side of the rotor and said second pair of polar pieces magnetically interconnecting the stator pole shoes located on said second side of the rotor, wherein the stator pole shoes interconnected by said peripheral polar pieces extend therefrom toward the axis of rotation of the rotor and the stator poles shoes interconnected by said central polar pieces extend therefrom toward a periphery of the rotor;
  a plurality of connecting sections magnetically connecting each of said peripheral and central polar pieces to an end of the core of said coil; and
  a breach provided in each peripheral polar piece between two of the stator pole shoes interconnected thereby, the breach of each peripheral polar piece being angularly displaced with respect to each other such that the connecting section of each central polar piece extends through a breach.

2. A single-phased motor according to claim 1, wherein N equals a positive integer multiple of four and in which the breaches of each peripheral polar piece are diametrically opposed.

3. A single-phased motor according to claim 2, wherein each connecting section is integral with a corresponding peripheral polar piece or central polar piece.

4. A single-phased motor according to claim 3, wherein each of said plurality of connecting sections integral with a corresponding peripheral polar piece originates from a portion thereof which is diametrically opposed to its respective breach and wherein each of said plurality of connecting sections integral with a corresponding central polar piece originates from an end of a stator pole shoe located in front of said breach.

5. A single-phased motor according to claim 2, wherein each of said peripheral polar pieces and their respective connecting sections and each of said central polar pieces and their respective connecting sections have the same shape and thickness.

6. A single-phased motor according to claim 1, wherein said coil and said core are located on side first side of said rotor, the axis of said core being equidistant from outer faces of the stator.

7. A single-phased motor according to claim 1, wherein each of said stator pole shoes is asymmetric with respect to a median plane passing through the axis of rotation of said rotor.

* * * * *